United States Patent
Leung et al.

(10) Patent No.: US 10,698,300 B2
(45) Date of Patent: Jun. 30, 2020

(54) APPARATUS FOR MOBILE PHONE PHOTOGRAPHY

(71) Applicants: Seung Wah Leung, Hong Kong (CN); Siu Chun Ng, Hong Kong (CN)

(72) Inventors: Seung Wah Leung, Hong Kong (CN); Siu Chun Ng, Hong Kong (CN)

(*) Notice: Subject to any disclaimer, the term of this patent is extended or adjusted under 35 U.S.C. 154(b) by 0 days.

(21) Appl. No.: 16/321,590

(22) PCT Filed: Jan. 29, 2018

(86) PCT No.: PCT/IB2018/050510
§ 371 (c)(1),
(2) Date: Jan. 29, 2019

(87) PCT Pub. No.: WO2018/142257
PCT Pub. Date: Aug. 9, 2018

(65) Prior Publication Data
US 2020/0081324 A1     Mar. 12, 2020

(30) Foreign Application Priority Data
Feb. 6, 2017     (HK) .................... 17101246.1

(51) Int. Cl.
*G03B 17/56* (2006.01)
*H04B 1/3877* (2015.01)
*H04N 5/225* (2006.01)

(52) U.S. Cl.
CPC ......... *G03B 17/561* (2013.01); *H04B 1/3877* (2013.01); *H04N 5/2253* (2013.01)

(58) Field of Classification Search
USPC ........................................ 396/419
See application file for complete search history.

(56) References Cited

U.S. PATENT DOCUMENTS

| 7,551,225 | B2 * | 6/2009 | Overstreet | ........... | F16M 11/041 |
| | | | | | 248/187.1 |
| 2013/0201316 | A1 * | 8/2013 | Binder | .................... | H04L 67/12 |
| | | | | | 348/77 |
| 2016/0209733 | A1 * | 7/2016 | Akai | .................... | F16M 11/041 |

FOREIGN PATENT DOCUMENTS

CN         103281483 A    *    9/2013

* cited by examiner

*Primary Examiner* — Clayton E. LaBalle
*Assistant Examiner* — Warren K Fenwick
(74) *Attorney, Agent, or Firm* — Jackson IPG PLLC; Demian K. Jackson (57) ABSTRACT

The present invention relates to an apparatus for mobile phone photography which comprises a bottom member, a reflective member, a support member and a mounting member. The bottom member comprises opposing first and second faces. The reflective member mounted to the first face of the said bottom member. A side portion of the support member is mounted to the second face of the bottom member. An angle θ having a range between 70 degrees and 110 degrees is formed between the support member and the bottom member and the mounting member is further mounted to the support member.

9 Claims, 12 Drawing Sheets

APPARATUS FOR MOBILE PHONE PHOTOGRAPHY

FIELD OF THE INVENTION

The invention relates to an auxiliary apparatus for mobile phone photography, in particular to an apparatus for mobile phone photography which can let a photo or a film shot by a mobile phone have a reflection effect.

BACKGROUND OF THE INVENTION

Because of advances in technology and the convenience of mobile phone, using mobile phone to shoot photos and films becomes more and more popular. However, in order to obtain special shooting effects, it is often necessary to use professional tools when shooting, or to use software such as photoshop to do post-production after shooting. A photo with a reflection effect is one of the kind. In order to let photos and films have a reflection effect, it is necessary to look for puddles of water that can produce reflection to take photos or shoot films, so as to create a reflection effect. This shooting method is often limited due to geographical constraints, inconvenient to operate, and time consuming. Alternatively, a reflection effect may also be produced by processing the photos after shooting with computer stunt or software like photoshop, but only professionals can produce a realistic reflection effect and the cost is high.

SUMMARY OF THE INVENTION

The problem to be solved in the present invention is to provide an apparatus for mobile phone photography adapted for making photographs and movies with reflection effects.

An apparatus for mobile phone photography comprising a bottom member; a reflective member; a support member; a mounting member; the said bottom member comprising opposing first and second faces; the said reflective member mounted to the said first face of the said bottom member; a side portion of the said support member mounted to said second face of said bottom member; an angle θ having a range between 70 degrees and 110 degrees being formed between the said support member and the said bottom member; and the said mounting member mounted to the said support member.

Typically, an end of the said second face of the said bottom member is mounted to an end of the said support member through a rotating shaft, the said bottom member is rotatably mounted to the said support member.

Typically, the said rotating shaft comprises at least one scale line arranged on the face of an end portion of the said rotating shaft, the value of the said at least one scale line corresponds to the value of the said angle θ.

Typically, the said reflective member is a non-transparent black-coloured acrylic film.

Typically, the reflecting plate has a length with a range between 70 mm and 100 mm, a width with a range between 30 mm and 55 mm and a thickness with a range between 2 mm and 4 mm.

Typically, the said support member comprises opposing third and fourth faces, the said third face is adjacent to the said second face of the said bottom member, both side faces of the said reflective member and the said bottom member adjacent to the said fourth face of the said support member are of the same planar surface with the said fourth face of the said support member.

Typically, the said mounting member is a clamping device, the said clamping device comprises first and second clamping structures, the said first clamping structure is mounted to the said second clamping structure by a rotating mounting structure, the said first clamping structure is mounted to a side portion of the said support member which is distal to the said second face of the said bottom member.

Typically, the said rotating mounting structure comprises a pin and a spring configured for receiving the said pin, both the said first and second clamping structures comprise opposing mounting elements extended from the said first and second clamping structures respectively, the said mounting element comprises a hole configured to be passed through by the said pin, both ends of the said spring are mounted on the said first and second clamping structures respectively.

Typically, the said mounting member is a mobile phone receiver, a portion of the said fourth face of the said support member is mounted to a front side of the said mobile phone receiver, the said mobile phone receiver comprises a camera aperture, the said reflective member is mounted to the lower end of the said camera aperture, a central portion of the said reflective member and the central portion of the said camera aperture are within the same vertical plane perpendicular to the said front side of the said mobile phone receiver.

Typically, the mounting member is a self-timer lever, the said self-timer lever comprises a clamping portion, an extendable shaft portion and a hand-held portion, the said clamping portion is mounted to a first end of the said extendable shaft portion, the said hand-held portion is mounted to a second end of the said extendable shaft portion, the said clamping portion is adapted for mounting a mobile phone, the said clamping portion comprises a support member mounting structure mounted to a side of the supporting member, the said reflective member is mounted to the lower end of the lens of the mobile phone when the mobile phone is mounted by the said clamping portion.

BRIEF DESCRIPTION OF THE DRAWINGS

This and other objects, features and advantages of the invention will become apparent upon reading of the following detailed descriptions and drawings, in which.

DESCRIPTION OF THE PREFERRED EMBODIMENTS

The invention will be further described with reference to the appended figures and embodiments in the following.

Figure 1:
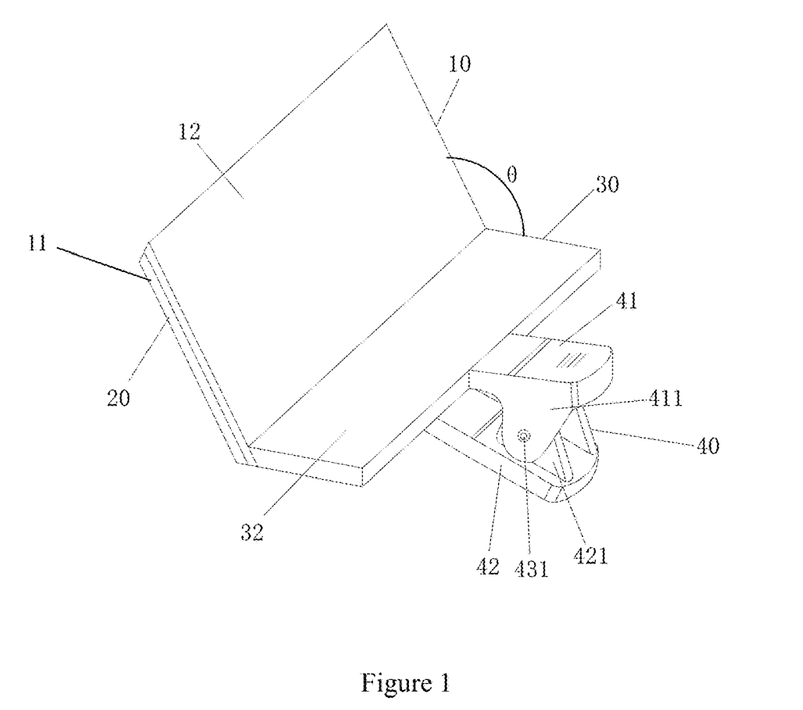
FIG. 1 is a front stereoscopic diagram of apparatus for mobile phone photography provided in a first embodiment of the present invention.
Figure 2:
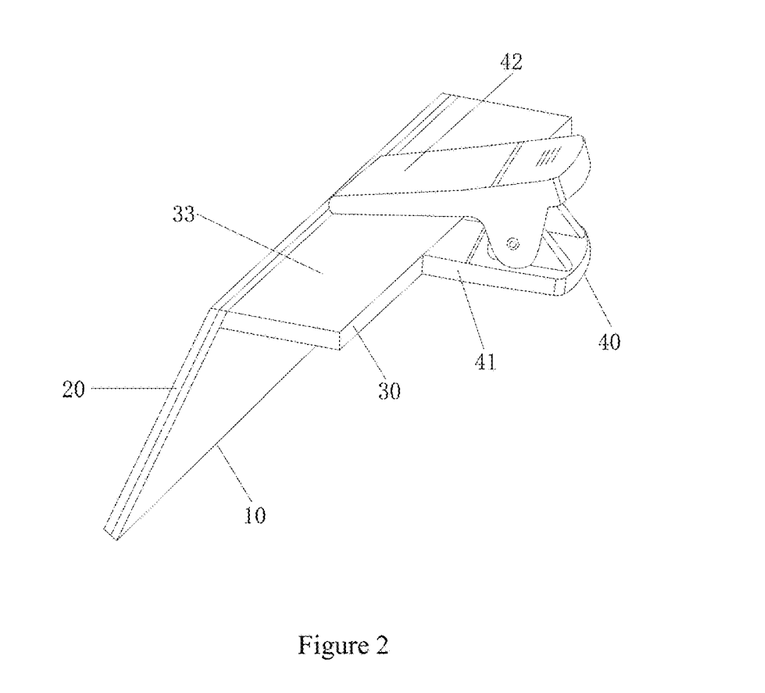
FIG. 2 is a back stereoscopic diagram of the apparatus for mobile phone photography shown in FIG. 1.

Referring to the first embodiment and FIG. 1 and FIG. 2, an apparatus for mobile phone photography provided by the present invention comprises a bottom member 10, a reflective member 20, a support member 30, and a mounting member. The bottom member 10 comprises opposing first face 11 and second face 12. The reflective member 20 is mounted to the first face 11, specifically the reflective member 20 is glued to the first face 11. Preferably, the reflective member 20 is of the same size and shape as the bottom member 10. More preferably, the shape of the reflective member 20 and the bottom member 10 are both rounded rectangles, and the size thereof is smaller than the length of either side of a mobile phone, so that the use of mobile phones by users will not be affected. A side portion of the support member 30 is mounted to a side portion in a length direction of the second face 12, and an angle θ having a range between 70 degrees and 110 degrees is formed between the support member 30 and the bottom member 10. The smaller the angle θ is, the smaller the ratio is between the reflection picture and the actual picture in the same photo. The mounting member is a clamping device 40 that is mounted to the support member 30.

The reflective member 20 is a non-transparent black-coloured flat member. Since Acrylic film is inexpensive in cost to manufacture, the flat member is preferably an Acrylic film. The reflective member has a length with a range between 70 mm and 100 mm, a width with a range between 30 mm and 55 mm and a thickness with a range between 2 mm and 4 mm.

The ambient light is too strong when shooting, and the filter glass of the mobile phone lens can not play the filtering role. In addition, the lens of the mobile phone cannot be attached with PL Filter, so the photographs or videos shot are overexposed. However, since the perception of brightness of non-transparent black-coloured acrylic film is one level aperture lower than the normal light, the filter glass of the mobile phone lens can play the filtering role, so that the reflected image shot by the present invention is softer and more appealing than the normal picture. In this embodiment, the reflective member has a length of 100 mm, a width of 55 mm, and a thickness of 2 mm, and is suitable for any type of mobile phone.

Figure 5:
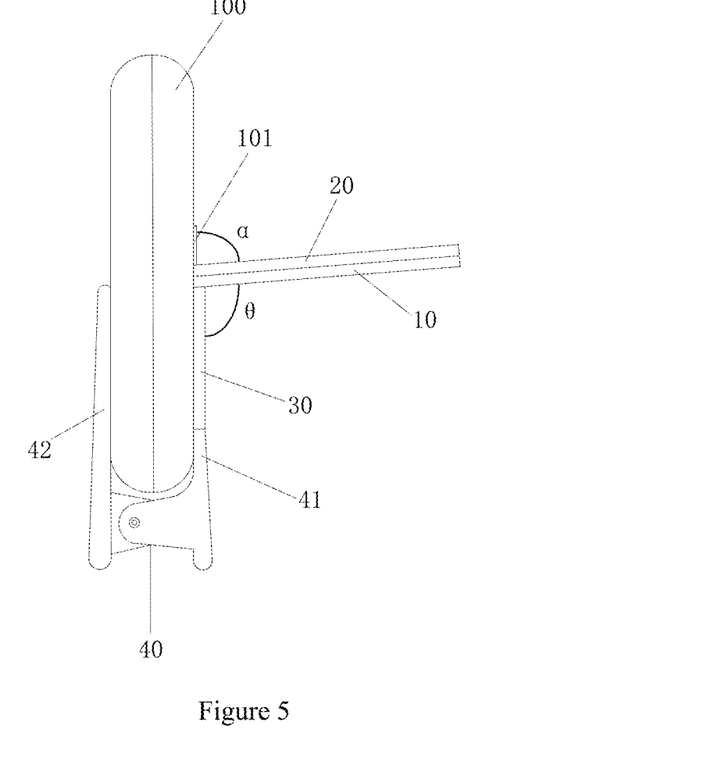
FIG. 5 is a schematic diagram showing the use of apparatus for mobile phone photography shown in FIG. 1 being mounted to a mobile phone by a clamping device in specific use.

The support member 30 comprises opposing third face 32 and fourth face 33. The third face 32 is adjacent to the second face 12 of the bottom member 10. Both side faces of the reflective member 20 and the bottom member 10 adjacent to the fourth face 33 are of the same planar surface with the fourth face 33. Referring to FIG. 5, when mounted to the mobile phone by the clamping device 40, both sides of the reflective member 20 and the bottom member 10 adjacent to the fourth face 33, and the fourth face 33 of the support member 30 can be attached to the back of the mobile phone. No other unwanted actual image will exist at the joint between the actual image and the reflected image in the photo, and the joint is more realistic and perfect.

Figure 3:
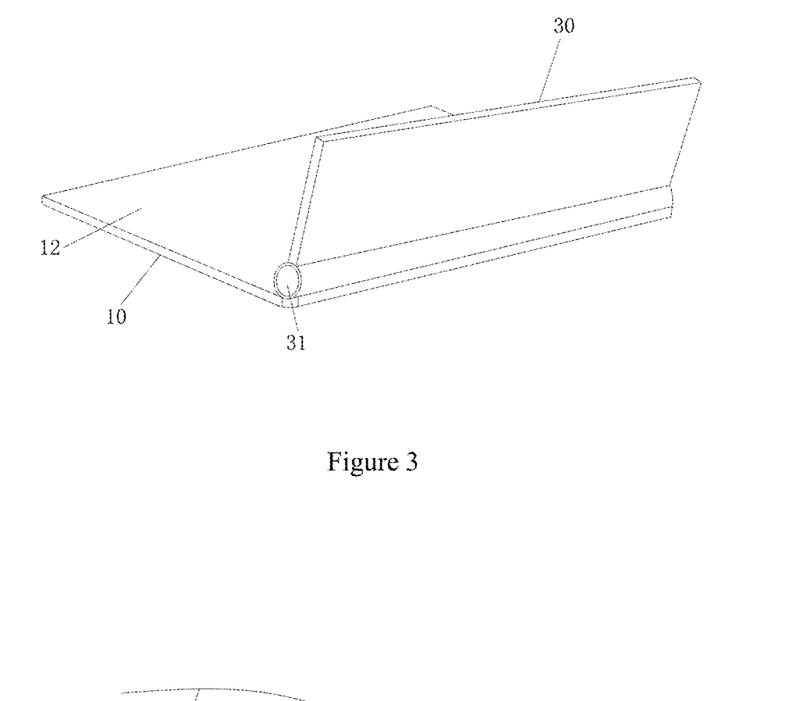
FIG. 3 is a schematic diagram showing the connection of the support member and the bottom member of the apparatus for mobile phone photography shown in FIG. 1.

As shown in FIG. 3, in the present embodiment, one side in a length direction of the second face 12 is mounted to one side of the support member 30 via a rotating shaft 31, and the bottom member 10 is rotatably mounted to the support member 30.

Figure 4:
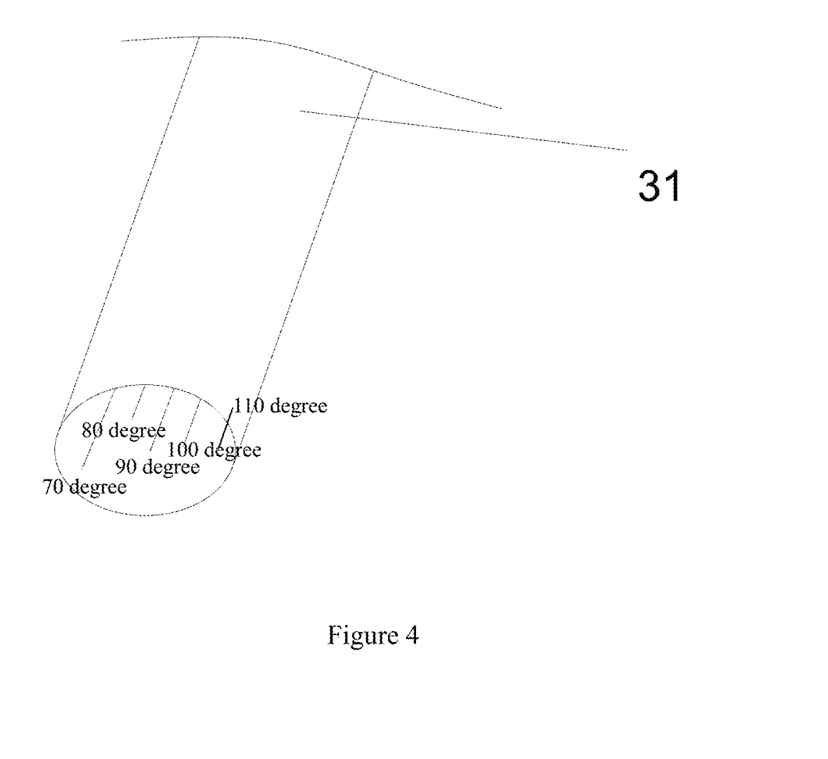
FIG. 4 is a partial schematic diagram of the rotating shaft shown in FIG. 3.

As shown in FIG. 4, rotating shaft 31 comprises at least one scale line arranged on the face of an end portion, the scale line corresponds to angle θ, for example, a 70-degree scale line, an 80-degree scale line, a 90-degree scale line, a 100-degree scale line, and a 110-degree scale line are simultaneously set. When the reflective member 20 (or deemed as the bottom member 10) is turned to the 100-degree scale line, the angle θ between the reflective member 20 (or deemed the bottom member 10) and the support member 30 is 100 degrees, then when the present invention and the lens 101 are used in combination, since the angle α between the reflective member 20 and the lens 101 is complementary to θ, α is of 80 degrees. The use of other scale lines is similar to it and will not be described again. The setting of scale lines facilitates realizing a desired shooting effect by photographers. In other embodiments, different combinations of scale lines can also be set, such as setting a scale line every 5 degrees. By adjusting the angle between the reflective member 20 (or deemed as the bottom member 10) and the support member 30, namely, adjusting the angle between the reflective member 20 (or deemed as the bottom member 10) and the lens 101 by turning the reflective member 20 (or deemed as rotating the bottom member 10), the reflected image of the photographs shot may have multiple effects. This is because when shooting at the same position, different degree of angle will make the height, width, etc. differ between the reflected image and the actual image. Moreover, when shooting at the same position, if the shooting time is different, the sun's illumination angle will be different. And difference in degree of the angle will lead to the difference in height and width between the reflected image of photographs shot and the actual image.

In other embodiments, since the film has certain elasticity, the rotating shaft 31 may not be actually set, or one side portion of the support member 30 may be mounted to one side portion in a length direction of the second face 12 by other means such as hinging. The clamping device 40 comprises the first clamping structure 41 and the second clamping structure 42, and the first clamping structure 41 is mounted to the second clamping structure 42 by a rotating mounting structure. The first clamping structure 41 is mounted to a side portion of the support member 30 which is distal to the second face 12. Specifically, the first clamping structure 41 is integrally formed with a side portion of the support member 30 which is distal to the second face 12. Of course, the first clamping structure 41 may also be mounted to the side portion of the support member 30 which is distal to the second face 12 by an auxiliary process such as gluing or welding. The central portion of the first clamping structure 41 and the central portion of the support member 30 are within the same vertical plane. The second clamping structure 42 is mounted on the support member 30.

The rotating mounting structure comprises a pin 431 and a spring configured for receiving the said pin 431. Both the first clamping structure 41 and the second clamping structure 42 comprise opposing mounting elements 411 and 421 extended, the mounting elements 411 and 421 comprise holes configured to be passed through by the said pin 431. Both ends of the said spring are mounted on the first clamping structure 41 and the second clamping structure 42 respectively.

Figure 6:
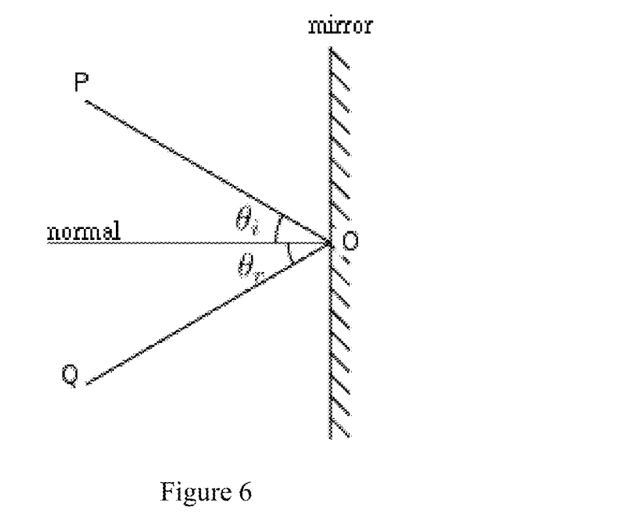
FIG. 6 is a schematic diagram of the Fermat principle.

Preferably, as shown in FIG. 5, through mounting the mobile phone 100 with a clamping device 40 and further under the action of the first clamping structure 41, the support member 30 is mounted against the back of the mobile phone 100, and the second clamping structure 42 is mounted on the front of the mobile phone 100, the reflective member 20 is in contact with the lower end of the lens 101 of the mobile phone 100, and the central portion of the lens 101 and the central portion of the reflective member 20 are within the same vertical plane. Turn on lens 101, then photographs can be shot. At the time of shooting, a part of the image directly enters the lens 101 to forms an actual image, and another part of image is irradiated to the reflective member 20 first. Since the angle θ between the support member 30 and the bottom member 10 is of 100 degrees, the angle α between reflective member 20 and the lens 101 is of 80 degrees, so that another part of the image that is irradiated to the reflective member 20 will be reflected to the lens 101 to form a reflected image. According to the law of reflection of Fermat principle, also known as the principle of stationary time, in combination with FIG. 6, the incident angle of light is equal to the angle of reflection of light, and the size of the image irradiated onto the reflective member 20 is the same as the size of the reflection image reflected to the lens 101, so the size of the reflection image will not be changed. In this way, the actual image shot is of the same size as the reflection image, and a photograph with reflection effect is thereby shot.

Figure 7:
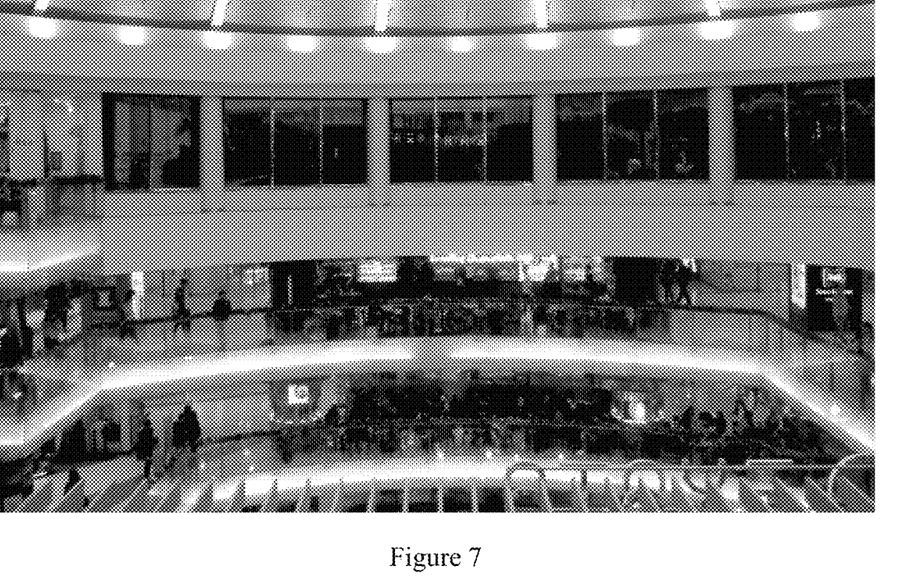
FIG. 7 is a photographic effect diagram of a photograph shot without using the apparatus for mobile phone photography provided by the present invention.
Figure 8:
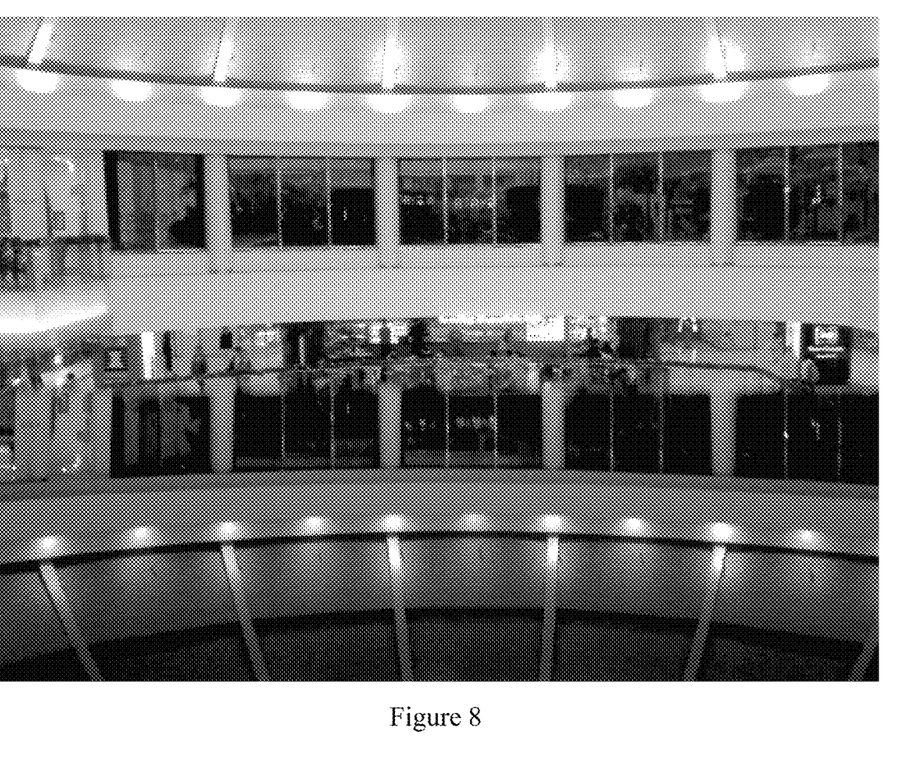
FIG. 8 is a photographic effect diagram in comparison with FIG. 7 after using the apparatus for mobile phone photography provided by the present invention.
Figure 9:
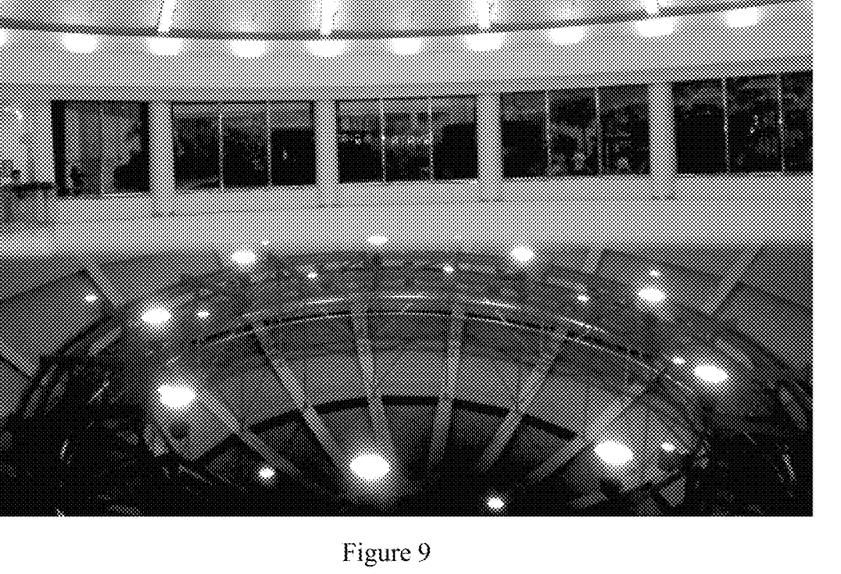
FIG. 9 is the second photographic effect diagram in comparison with FIG. 8.
Figure 10:
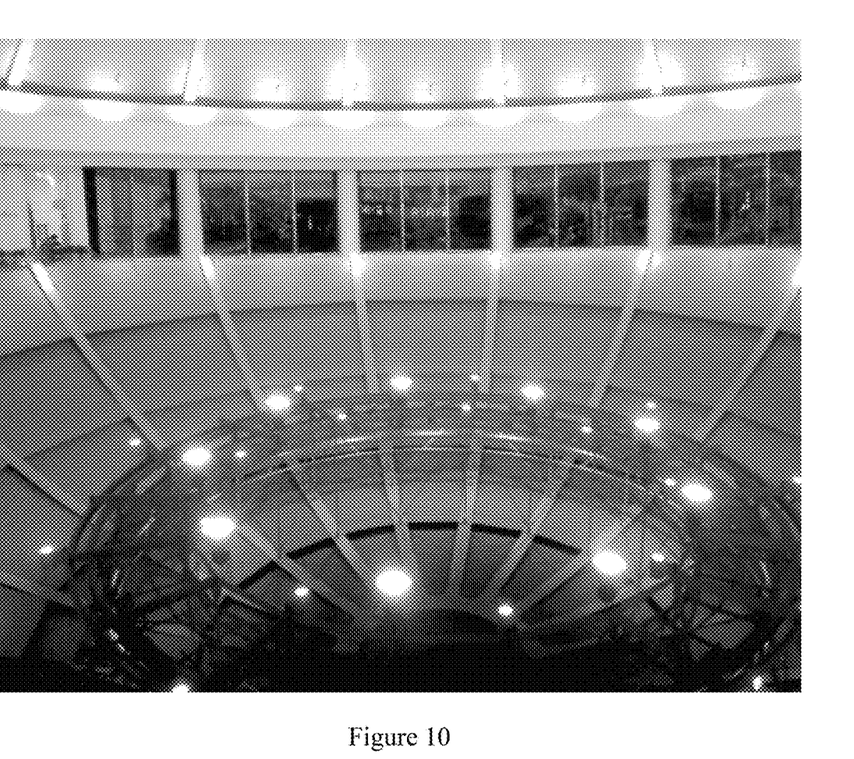
FIG. 10 is the third photographic effect figure in comparison with FIG. 8.

If the user wants to have the photo effect that the reflection image and the actual image are of different sizes, you can also achieve this by turning the reflective member 20 (or deemed as the bottom member 10) to increase or decrease various angle degrees. For example, if the height of the reflection image is smaller than the height of the actual image, the reflective member 20 (or deemed as the bottom member 10) can be turned to the 100-degree scale line, and the angle θ between the reflective member 20 (or deemed as the bottom member 10) and the support member 30 is of 100 degrees, namely, when the lens 101 is used in conjunction, the angle α between the lens 101 and the reflective member 20 is of 80 degrees. If you want to shoot a reflection image higher than the actual image, the reflective member 20 (or deemed as the bottom member 10) can be turned to the 110-degree scale line, and the angle θ between the reflective member 20 (or deemed as the bottom member 10) and the support member 30 can be of 110 degrees, so that the angle α between the lens 101 and the reflective member 20 is of 70 degrees, and the user may adjust the degree of the angle between the lens 101 and the reflective member 20 according to the reflection effect actually required. FIG. 7 is an photo effect diagram of a photograph shot by a mobile phone when the apparatus for mobile phone photography of the present invention is not used. It can be seen that the upper half of the photograph is the shopping mall building itself, and the lower half of the photograph is a dense stream of people. FIG. 8 is an effect diagram of a photograph taken by a mobile phone when the apparatus for mobile phone photography of the present invention is used, and an angle between the support member 30 and the reflective member 20 (or deemed as the bottom member 10) is of 90 degrees (i.e. the angle between the reflective member 20 and the lens 101 is of 90 degrees). It can be seen that the lower half of the photograph is the reflection of the upper half. FIG. 9 is an effect diagram of a photograph shot by a mobile phone when the apparatus for mobile phone photography of the present invention is used, and the angle between the support member 30 and the reflective member 20 (or deemed as the bottom member 10) is of 100 degrees (i.e. the angle between the reflective member 20 and the lens 101 is of 80 degrees). FIG. 10 is an effect diagram of a photograph shot by a mobile phone when the apparatus for mobile phone photography of the present invention is used, and the angle between the support member 30 and the reflective member 20 (or deemed as the bottom member 10) is of 110 degrees (i.e. the angle between the reflective member 20 and the lens 101 is of 70 degrees). It can be seen that as the angle between the support member 30 and the reflective member 20 (or deemed as the bottom member 10) increases (i.e. the angle between the reflective member 20 and the lens 101 decreases), the ratio of the height of reflection image to the height of the image that the lens can capture is gradually increasing.

Figure 11:
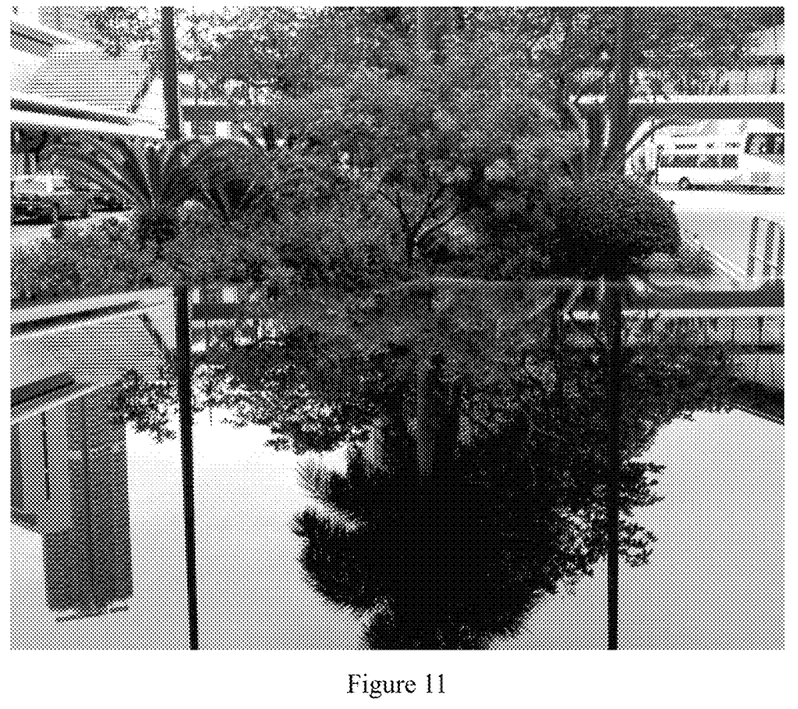
FIG. 11 is another photographic effect diagram using the apparatus for mobile phone photography provided by the present invention.
Figure 12:
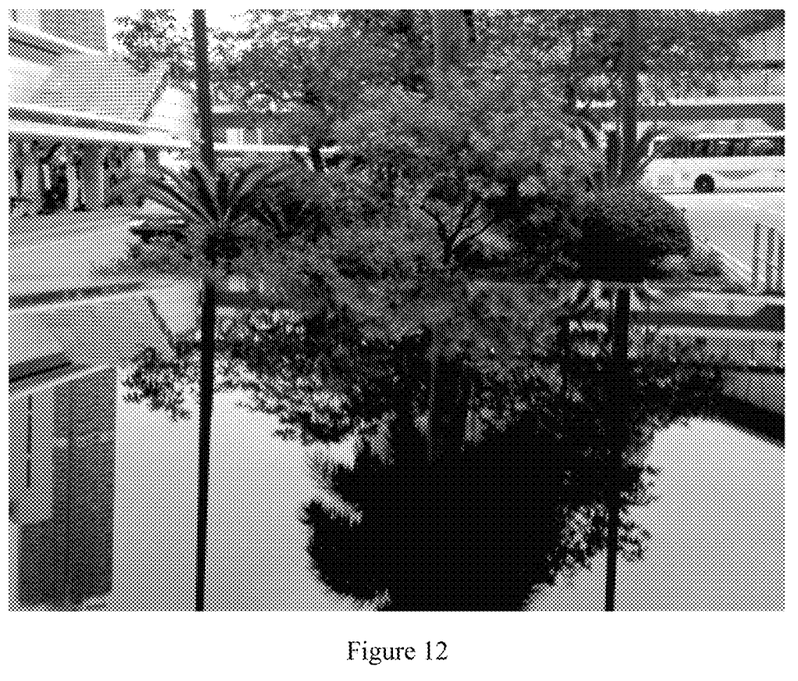
FIG. 12 is a photographic effect diagram in comparison with FIG. 11.
Figure 13:
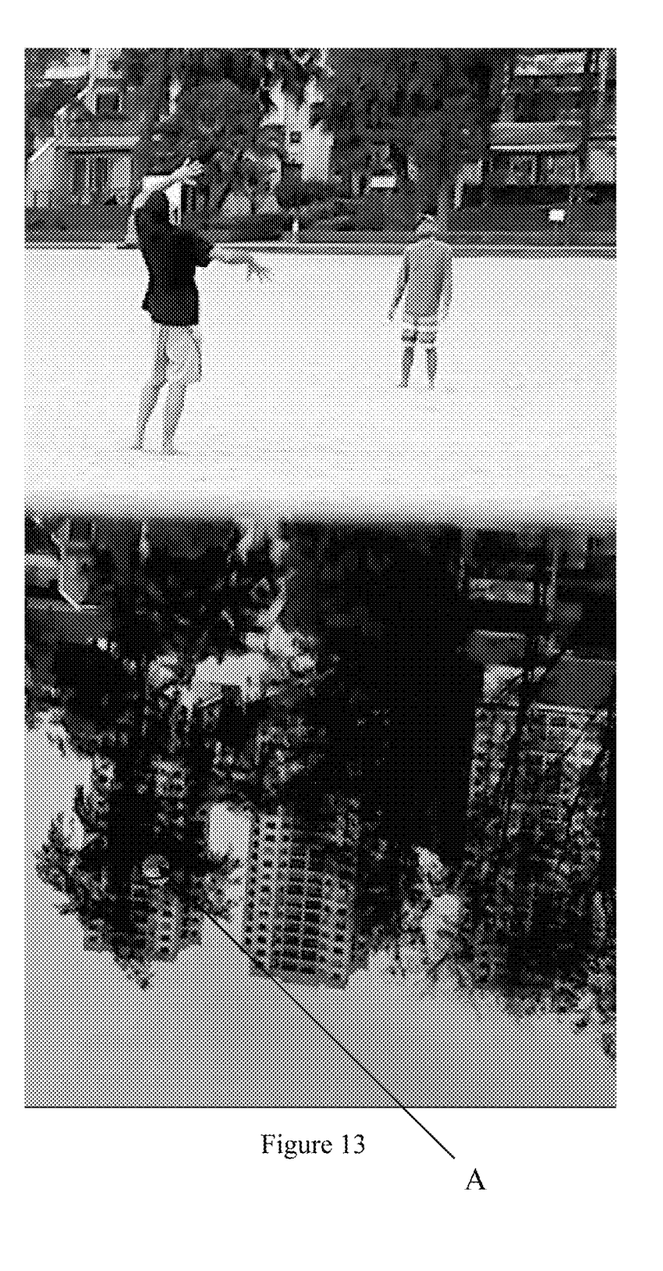
FIG. 13 is the third photographic effect diagram using the apparatus for mobile phone photography provided by the present invention.
Figure 14:
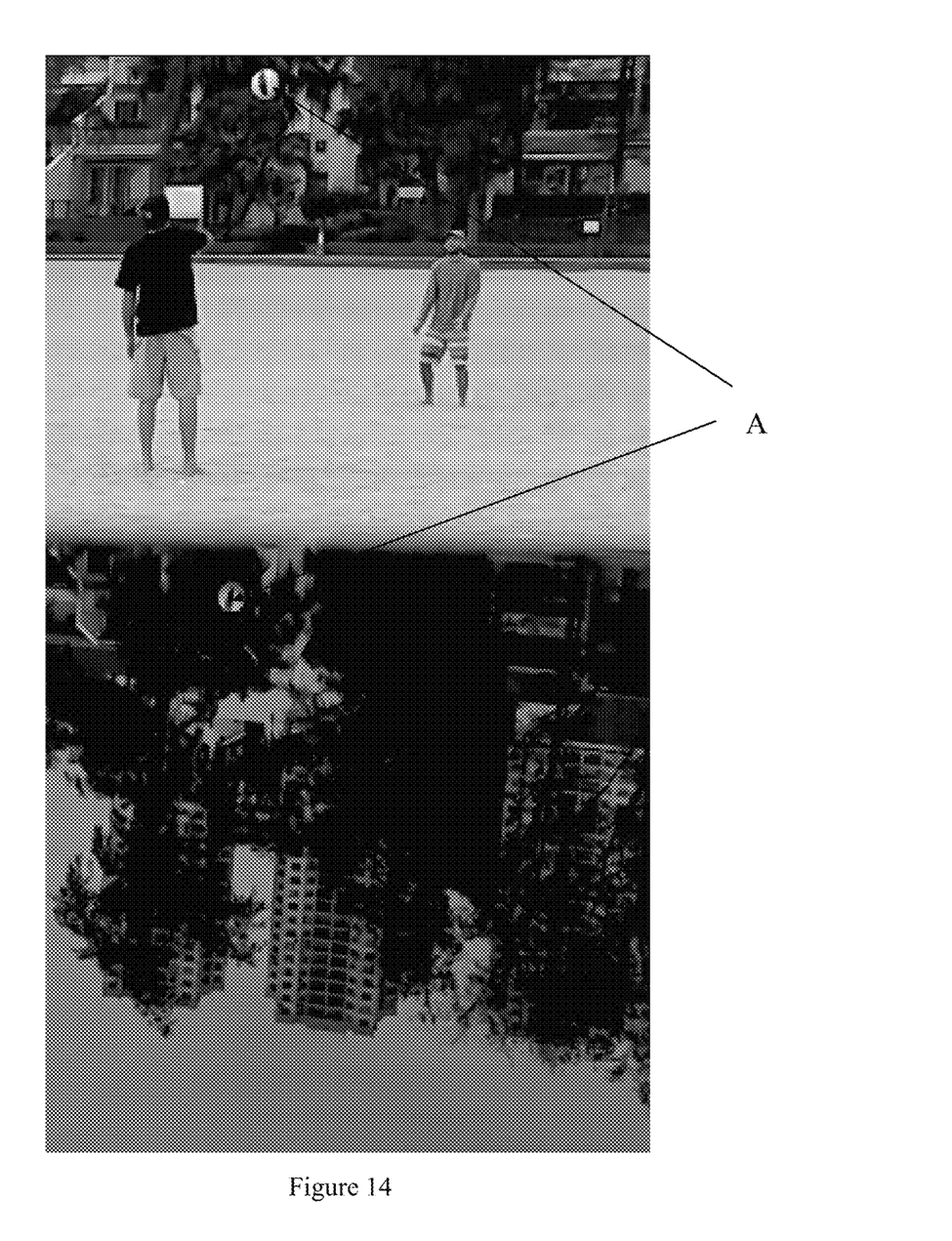
FIG. 14 is a photographic effect diagram in comparison with FIG. 13.

In addition, when the shooting position is the same, the shooting time is different, and the angle of the sun's illumination is different, if you want to shoot a photo with the same reflection effect, you can also achieve it by turning the reflective member 20 (or deemed as the bottom member 10) and increasing or decreasing various angle degrees. FIG. 11 is an effect diagram of a photograph taken by a mobile phone when the apparatus for mobile phone photography of the present invention is used, and the angle between the support member 30 and the reflective member 20 (or deemed as the bottom member 10) is of 100 degrees (i.e. the angle between the reflective member 20 and the lens 101 is of 80 degrees), and the shooting time is 3 pm in the afternoon. FIG. 12 is an effect diagram of a photograph shot by a mobile phone when the apparatus for mobile phone photography of the present invention is used, and the angle between the support member 30 and the bottom member 10 is of 100 degrees (i.e. the angle between the reflective member 20 and the lens 101 is of 80 degrees). and the shooting time is 5 pm. It can be seen that although FIG. 11 and FIG. 12 have the same shooting position and the same angle of shooting, the effect of the picture is not the same due to different shooting time and different angle of illumination of the sun, but it can be clearly seen that the entry height in lens of the building on the left side of the picture is not the same. Referring to FIGS. 13 to 14, which are the effect diagram shot by a mobile phone when the apparatus for mobile phone photography of the present invention is used, the angle between the support member 30 and the reflective member 20 (or deemed as the bottom member 10) is of 100 degrees (i.e. the angle between the reflective member 20 and the lens 101 is of 80 degrees). In FIG. 13, limited by the lens frame, the volleyball or the higher buildings can't be captured in the actual image shot. However, after using the apparatus for mobile phone photography of the present invention, volleyball A, the higher buildings even the sky can bee seen in the lower half of FIG. 13, and the height of the volleyball A almost reaches visually the top floor of the building. In FIG. 14, even two volleyballs appear at the same time, and the actual situation is that there is only one volleyball. Therefore, after using the apparatus for mobile phone photography of the present invention, and by means of angle adjusting, it is possible to shot a photograph which is not likely to be shot. According to Fermat's principle, light enters the lens by selecting the shortest path. Since it is impossible for people to play volleyball to the top of the building, the volleyball in FIG. 13 is not a reflection, but a real image, so the reflection image and the real image appear in the reflection picture at the same time.

In this way, photos with reflection effect may be shot by the invention, and it is not necessary to take great pains to look for puddles of water to form a reflection, and it is not necessary to use stored water to produce puddles of water to achieve a reflection effect, and it is not necessary to process special effect of reflection with computer stunt or software such as photoshop.

Figure 15:
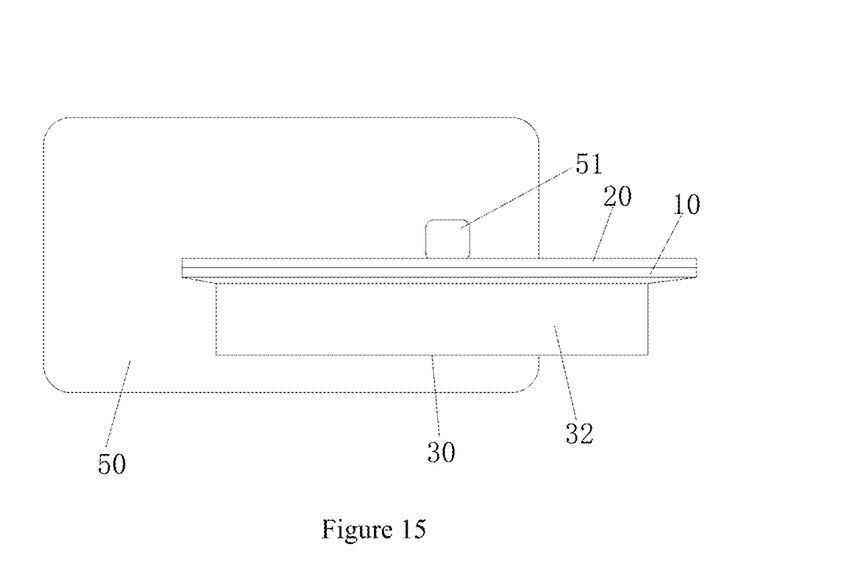
FIG. 15 is a primary visual diagram of apparatus for mobile phone photography of a second embodiment of the present invention.
Figure 16:
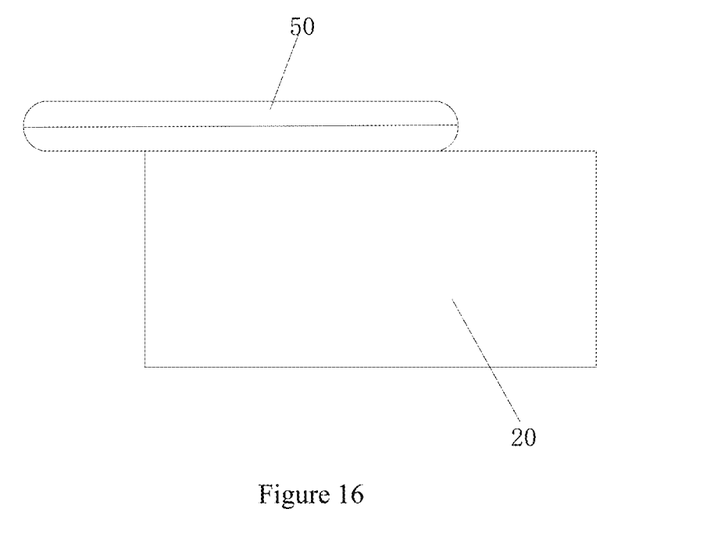
FIG. 16 is a top schematic diagram of the apparatus for mobile phone photography shown in FIG. 15.
Figure 17:
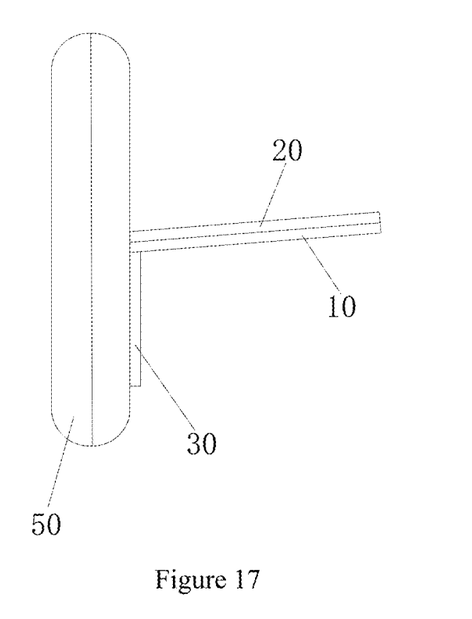
FIG. 17 is a left schematic diagram of the apparatus for mobile phone photography shown in FIG. 15.

Referring to the second embodiment and FIGS. 15 to 17, this embodiment is different from the first embodiment 1 in that the mounting member is a mobile phone receiver 50. The support member 30 comprises opposing third face 32 and fourth face 33. The fourth face 33 is partially mounted to the front side of the mobile phone receiver 50. Specifically, the length extension direction of the fourth face 33 is parallel with that of the mobile phone receiver 50. Of course, it may also be that, the length extension direction of the fourth face 33 is perpendicular to that of the mobile phone receiver 50. The mobile phone receiver 50 has a camera aperture 51. The reflective member 20 is in contact with the lower end of the camera aperture 51, and the central portion of the reflective member 20 and the central portion of the camera aperture 51 is within the same vertical plane.

Preferably, the mobile phone receiver 50 is configured to receive the mobile phone, so that the lens of the mobile phone is accommodated in the camera aperture 51, then turn on the lens, so that the photographs with the reflection effect can be shot.

Figure 18:
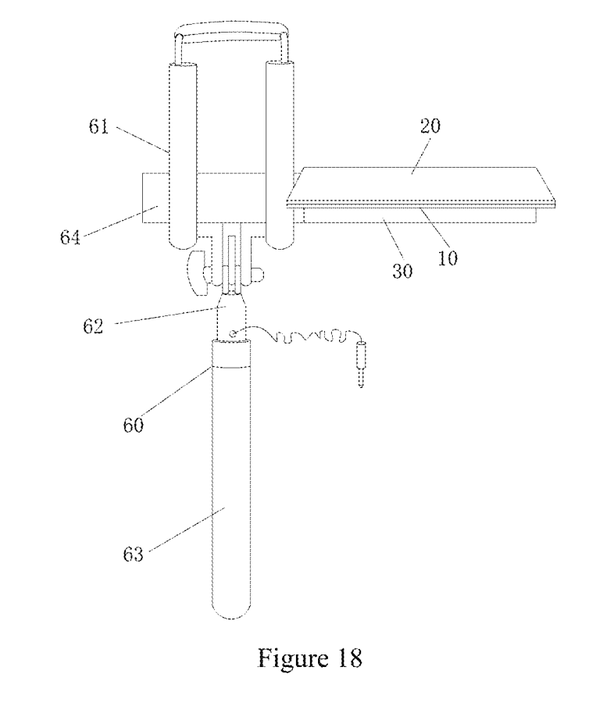
FIG. 18 is a primary visual figure of an apparatus for mobile phone photography provided by Embodiment 3 of the present invention.
Figure 19:
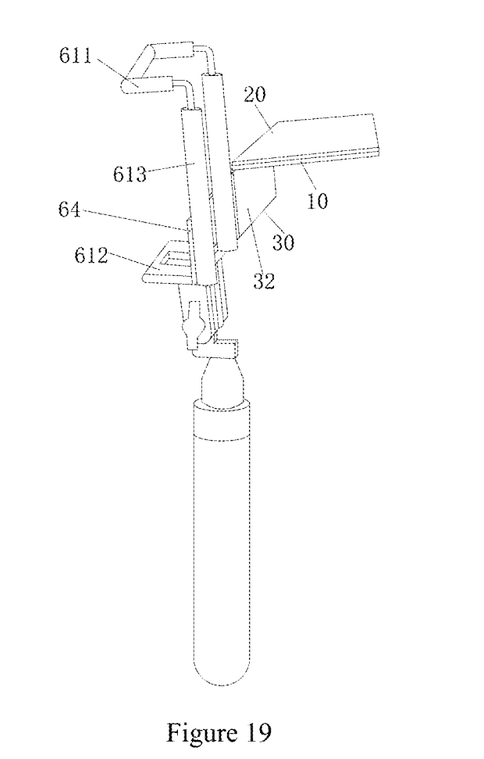
FIG. 19 is a left schematic diagram of the apparatus for mobile phone photography shown in FIG. 18.
Figure 20:
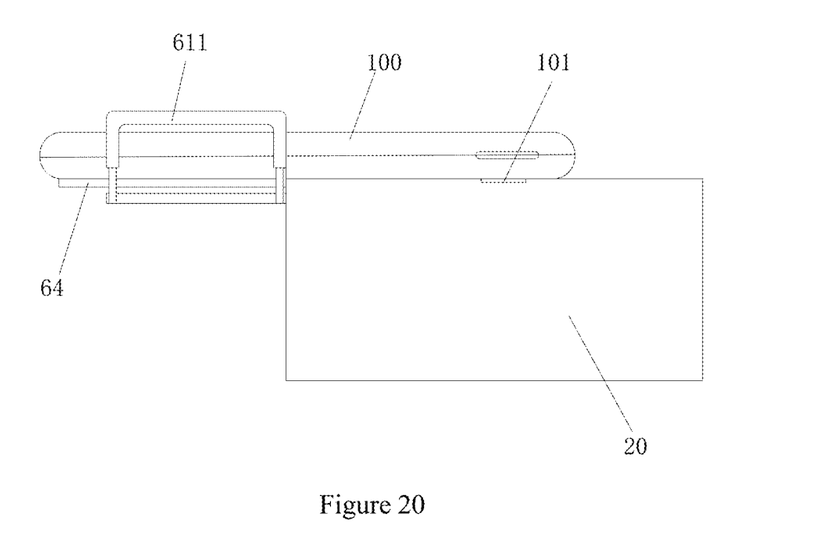
FIG. 20 is a top schematic diagram of the apparatus for mobile phone photography shown in FIG. 18 when it is mounted to a mobile phone by a self-timer lever.

Referring to the third embodiment and FIGS. 18 to 20, this embodiment differs from Embodiment 1 in that the mounting member is a self-timer lever 60. The self-timer lever 60 comprises a clamping portion 61, an extendable shaft portion 62 and a hand-held portion 63. One end of the extendable shaft portion 62 is mounted to the clamping portion 61, for example, by a rotational connection; the other end is fixedly mounted to the hand-held portion 63. The clamping portion 61 is adapted for mounting a mobile phone, comprising an upper chuck 611, a lower chuck 612, and a joint lever 613 connecting the upper chuck 611 and the lower chuck 612. Between the upper chuck 611, the lower chuck 612 and the joint lever 613, an mounting space for accommodating a mobile phone is formed. A mounting member 64 is set on one side of the mounting space 613, and the mounting member 64 is mounted to one side of the support member 30. Specifically, the mounting member 64 is mounted to one side of a width direction of the support member 30, and the two faces of the mounting member 64 is of the same planar surface with the two faces of support member 30. When the clamping portion 61 mounts a mobile phone, the reflective member 20 comes into contact with the lower end of the lens of the mobile phone, and the mounting member 64 and the support member 30 are mounted on the back of the mobile phone.

Preferably, the clamping portion 61 mounts the mobile phone, and the mounting member 64 and the support member 30 are attached to the back of the mobile phone, so that the reflective member 20 is in contact with the lower end of the lens of the mobile phone, and the central portion of the lens and the central portion of the reflective member 20 are within the same vertical plane. Then turned on the lens to take a photography with a reflection effect. The invention has the advantages of simple structure, convenient operation, time saving and labor saving, and the reflection effect of the photograph shot by the mobile phone is appealing and realistic.

The above embodiments merely describe the preferred embodiments of the present invention, and the description thereof is to be considered as specific and detailed, but it shall not be construed as a limit to the scope of the patent of the invention. It shall be noted that a number of variations and modifications may also be made by ordinary technical personnel in the field without departing from the inventive concept of the present invention, such as combining different features in the embodiments, all of which are in the scope of protection of the present invention.

The present invention has been described in detail, with reference to the preferred embodiment, in order to enable the reader to practice the invention without undue experimentation. However, a person having ordinary skill in the art will readily recognize that many of the previous disclosures may be varied or modified somewhat without departing from the spirit and scope of the invention. Accordingly, the intellectual property rights to this invention are defined only by the following claims.

The invention claimed is:

1. An apparatus for mobile phone photography comprising:
   a bottom member;
   a reflective member;
   a support member;
   a mounting member;
   the said bottom member comprising opposing first and second faces;
   the said reflective member mounted to the said first face of the said bottom member;
   a side portion of the said support member mounted to said second face of said bottom member;
   an angle θ having a range between 70 degrees and 110 degrees being formed between the said support member and the said bottom member; and the said mounting member mounted to the said support member,
   wherein the said reflective member is a non-transparent black-coloured acrylic film.

2. The apparatus for mobile phone photography according to claim 1, wherein an end of the said second face of the said bottom member is mounted to an end of the said support member through a rotating shaft, the said bottom member is rotatably mounted to the said support member.

3. The apparatus for mobile phone photography according to claim 2, wherein the said rotating shaft comprises at least one scale line arranged on the face of an end portion of the said rotating shaft, the value of the said at least one scale line corresponds to the value of the said angle θ.

4. The apparatus for mobile phone photography according to claim 1, wherein the reflecting plate has a length with a range between 70 mm and 100 mm, a width with a range between 30 mm and 55 mm and a thickness with a range between 2 mm and 4 mm.

5. The apparatus for mobile phone photography according to claim 4, wherein the said support member comprises opposing third and fourth faces, the said third face is adjacent to the said second face of the said bottom member, both side faces of the said reflective member and the said bottom member adjacent to the said fourth face of the said support member are of the same planar surface with the said fourth face of the said support member.

6. The apparatus for mobile phone photography according to claim 5, wherein the said mounting member is a mobile phone receiver, a portion of the said fourth face of the said support member is mounted to a front side of the said mobile phone receiver, the said mobile phone receiver comprises a camera aperture, the said reflective member is mounted to the lower end of the said camera aperture, a central portion of the said reflective member and the central portion of the said camera aperture are within the same vertical plane perpendicular to the said front side of the said mobile phone receiver.

7. The apparatus for mobile phone photography according to claim 5, wherein the mounting member is a self-timer lever, the said self-timer lever comprises a clamping portion, an extendable shaft portion and a hand-held portion, the said clamping portion is mounted to a first end of the said extendable shaft portion, the said hand-held portion is mounted to a second end of the said extendable shaft portion, the said clamping portion is adapted for mounting a mobile phone, the said clamping portion comprises a support member mounting structure mounted to a side of the supporting member, the said reflective member is mounted to the lower end of the lens of the mobile phone when the mobile phone is mounted by the said clamping portion.

8. The apparatus for mobile phone photography according to claim 5, wherein the said mounting member is a clamping device, the said clamping device comprises first and second clamping structures, the said first clamping structure is mounted to the said second clamping structure by a rotating mounting structure, the said first clamping structure is mounted to a side portion of the said support member which is distal to the said second face of the said bottom member.

9. The apparatus for mobile phone photography according to claim 8, wherein the said rotating mounting structure comprises a pin and a spring configured for receiving the said pin, both the said first and second clamping structures comprise opposing mounting elements extended from the said first and second clamping structures respectively, the said mounting element comprises a hole configured to be passed through by the said pin, both ends of the said spring are mounted on the said first and second clamping structures respectively.

* * * * *